UNITED STATES PATENT OFFICE 1,948,923

SUBSTITUTED BENZO - CARBAZOLE - CARBOXYLIC ACID AND PROCESS OF PREPARING IT

Georg Kalischer, Frankfort-on-the-Main, Otto Limpach, Wiesbaden-Biebrich, and Karl Hager, Frankfort-on-the-Main, Germany, assignors to General Aniline Works, Inc., New York, N. Y., a corporation of Delaware No Drawing. Application March 16, 1931, Serial No. 523,184. In Germany March 19, 1930

12 Claims. (Cl. 260—46)

The present invention relates to substituted benzo-carbazole-carboxylic acids and to a process of preparing them.

Hitherto it has been known that by causing a hydroxynaphthoic acid to react with bisulfite so as to form a bisulfite addition compound or a further reaction product from the latter, the carboxylic acid group is very easily split off (cf. Bucherer, Zeitschrift für Farben- und Textilchemie 1, 477; 1902 "Ueber die Einwirkung schweflig-saurer Salze auf aromatische o-Oxyverbindungen"). It has, therefore, not been possible to produce benzocarbazole carboxylic acids from hydroxy compounds by way of bisulfite addition compounds.

Now, we have found that the carboxylic acid group of a hydroxy naphthoic acid, such as contains in the nucleus at least one further substituent is considerably more stable against the action of bisulfite. This fact is very surprising and opens a new industrial way for the preparation of substituted benzocarbazole-carboxylic acids. There is obtained in a simple manner, for instance, by causing 2.8-dihydroxy-3-naphthoic acid to react with bisulfite and phenylhydrazine the valuable 7.8-benzocarbazole-3'-hydroxy-2'-carboxylic acid.

The present invention relates to a process which comprises heating a bisulfite solution with a salt of a compound of the following general formula

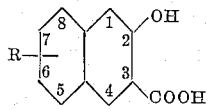

wherein R represents a hydroxy- or an amino group in 5- or 8-position, and further heating the bisulfite addition compound, thus obtained, with an arylhydrazine in the presence of a mineral acid. The first step of our process is preferably carried out by heating a bisulfite solution with an acid of the above formula which has been neutralized by means of caustic alkali.

The new products obtainable according to the present invention may be characterized by the following formula:

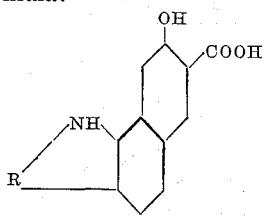

wherein R stands for a naphthalene radical bound in 1.2-position, which may contain substituents.

The new products are yellow substances which melt at temperatures above 300° C. and dissolve in dilute sodium carbonate solution.

The following examples serve to illustrate the invention, but they are not intended to limit it thereto, the parts being by weight:

(1) 318 parts of technical sodium-bisulfite solution (= 1 mol) are diluted with 550 parts of water and neutralized by means of 131 parts of caustic soda solution of 40° Bé. (=1 mol) whereupon 31.8 parts of sodium-bisulfite solution are added (as a 10% excess). 222 parts of 2.8-dihydroxy-naphthalene-3-carboxylic acid of 92% (=1 mol 100%) are then added while stirring and the whole is boiled for 6 hours under reflux, acidified by addition of a mixture of 145 parts of sulfuric acid of 60° Bé. and 800 parts of water and 104 parts of phenylhydrazine are added. 256 parts of sulfuric acid of 60° Bé. are then run in at boiling temperature and the whole is boiled, while stirring and under reflux, until sulfur dioxide no longer is evolved (about 8 hours). The solution is filtered with suction, the solid matter is washed with hot water until neutral and, after drying, there are obtained about 195 parts of 7.8-benzo-carbazole-3'-hydroxy-2'-carboxylic acid in the form of a greenish yellow substance which easily dissolves in dilute sodium carbonate solution and hot nitrobenzene and is difficultly soluble in hot alcohol, glacial acetic acid and dichlorbenzene. After recrystallization from nitrobenzene, the product has a clear yellow color and melts at 329–330° C.

The new product has the following formula:

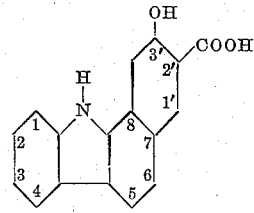

(2) By proceeding as indicated in Example 1, but using instead of 104 parts of phenylhydrazine, 118 parts of N-methylphenyl-hydrazine, there are obtained 195–205 parts of 7.8-benzo-N-methylcarbazole-3'-hydroxy-2'-carboxylic acid. The yellow product is soluble in dilute sodium carbonate solution, it scarcely dissolves in alcohol and glacial acetic acid and may be recrystallized from nitrobenzene or dichlorbenzene and thereafter melting at 310° C.

(3) 204 parts of 2.8-dihydroxy-3-naphthoic acid are dissolved in 450 parts of water while adding 160 parts of caustic soda solution of 40° Bé. and the solution is heated to boiling for 2 hours after addition of 640 parts of bisulfite solution of 38° Bé. 135 parts of para-tolylhydrazine are then added and the whole is boiled with an excess of sulfuric acid of 60° Bé. until the evolution of sulfur dioxide has ceased. The solution is filtered with suction, the solid matter is washed with hot water until neutral and there are obtained about 200 parts of 3-methyl-7.8-benzocarbazole-3'-hydroxy-2'-carboxylic acid (=68% of the theory). The 3-methyl-7.8-benzocarbazole-3'- hydroxy-2'- carboxylic acid has a yellowish color and dissolves in dilute sodium carbonate solution, in hot alcohol, glacial acetic acid and nitrobenzene; it is scarcely soluble in dichlorobenzene and melts at 334° C.

(4) By using in Example 3, 203 parts of 2-hydroxy-8-amino-3-naphthoic acid instead of 2.8-dihydroxy-3-naphthoic acid and 120 parts of phenylhydrazine instead of 135 parts of para-tolyl-hydrazine and otherwise proceeding as in Example 3, there is obtained 7.8-benzocarbazole-3'-hydroxy-2'-carboxylic acid with a yield of 60% of that of the theory.

(5) By proceeding as in Example 1, but using instead of 104 parts of phenylhydrazine, 118 parts of ortho-tolyl-hydrazine, there is obtained with an excellent yield 7.8-benzo-1-methyl-carbazole-3'-hydroxy-2'-carboxylic acid of the formula

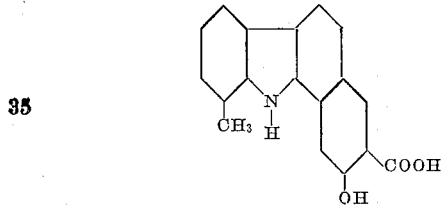

It forms a yellow substance which easily dissolves in sodium carbonate solution, difficultly dissolves in alcohol, glacial acetic acid, nitrobenzene and dichlorobenzene and melts at 330° C.

(6) By using instead of 104 parts of phenylhydrazine, 139 parts of meta-cholorophenylhydrazine and otherwise proceeding as indicated in Example 1, there are obtained 220 parts of 2-chloro-7.8-benzocarbazole-3'-hydroxy-2'-carboxylic acid in the form of a yellow substance which easily dissolves in dilute sodium carbonate solution. It is difficultly soluble in organic solvents such as alcohol, glacial acetic acid, dichlorobenzene or nitrobenzene; its melting point is above 330° C.

(7) By proceeding as indicated in Example 1, but using instead of 104 parts of phenylhydrazine, 158 parts of alpha-naphthylhydrazine, there are obtained 240 parts of 1.2.7.8-dibenzocarbazole-3'-hydroxy-2'-carboxylic acid of the formula:

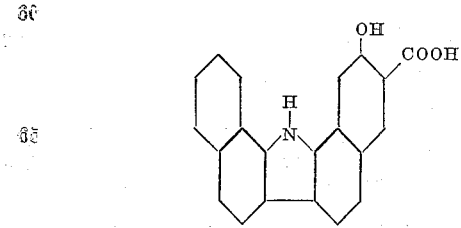

It dissolves in dilute sodium carbonate- and caustic alkali solutions.

(8) By using in Example 7 instead of 158 parts of alpha-naphthylhydrazine the equal quantity of beta-naphthylhydrazine, there is obtained with an equally good yield 3.4.7.8-dibenzocarbazole-3'-hydroxy-2'-carboxylic acid of the formula:

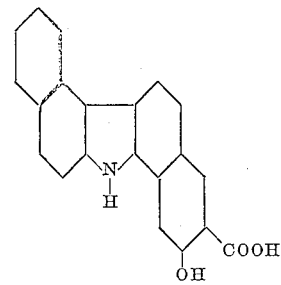

being a yellow substance which dissolves in dilute sodium carbonate solution.

(9) By proceeding as indicated in Example 7, but using instead of alpha-naphthylhydrazine, 193 parts of 5-chloro-1-naphthylhydrazine, there are obtained 270 parts of a chloro-1.2.7.8.-dibenzocarbazole-3'-hydroxy-2'-carboxylic acid of the formula:

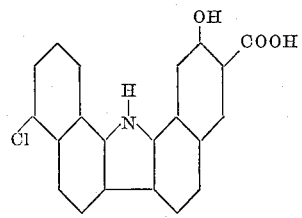

being a yellow substance which dissolves in dilute sodium carbonate solution.

(10) By reacting in Example 1, 1 mol of 2.8-hydroxy-3-naphthoic acid with bisulfite and using instead of 104 parts of phenylhydrazine 218 parts of 7-hydroxy-1-naphthylhydrazine-6-carboxylic acid (= 1 mol) and otherwise proceeding as indicated in Example 1, there is obtained with a good yield the di-(1.2.7.8-benzo)-carbazole-3'-3''-dihydroxy-2'.2''-dicarboxylic acid of the formula:

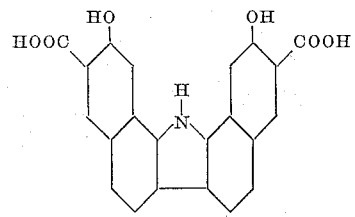

being a yellow substance which dissolves in dilute sodium carbonate solution.

(11) 204 parts of 2.5-dihydroxy-3-naphthoic acid are heated to boiling for a prolonged time with 1600 parts of bisulfite solution and 150 parts of caustic soda solution of 40° Bé. When the bisulfite addition compound has been formed, 135 parts of a tolylhydrazine are added and the whole is boiled with an excess of sulfuric acid of 60° Bé. until sulfur dioxide is no longer evolved. The hot solution is then filtered, the solid matter is washed until neutral and there is obtained with a good yield, after purification, the 1-methyl - 7.8 - benzocarbazole-2'-hydroxy-3'-carboxylic acid of the formula:

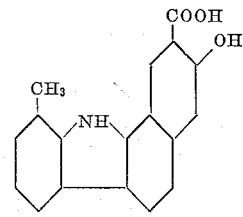

We claim:
1. The compounds of the following general formula:

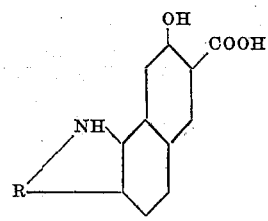

wherein R stands for a naphthalene radical bound in 1.2-position, which may contain chlorine or a hydroxy or carboxy group as substituents, being yellow substances which melt at temperatures above 300° C. and dissolve in dilute sodium carbonate solution.

2. The compound of the following formula:

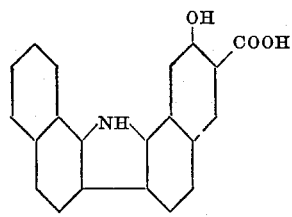

dissolving in dilute caustic soda- and caustic alkali solutions.

3. The compound of the following formula:

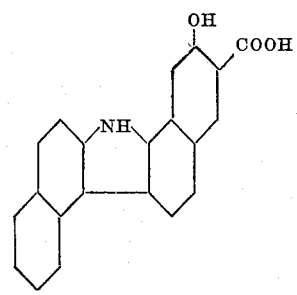

being a yellow substance, soluble in dilute sodium carbonate solution.

4. The compound of the following formula:

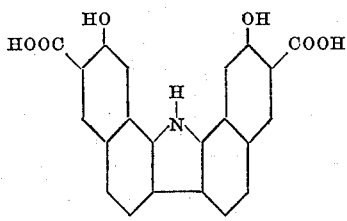

dissolving in dilute caustic soda- and caustic alkali solutions.

5. The process which comprises heating a bisulfite solution with a salt of a compound of the following general formula:

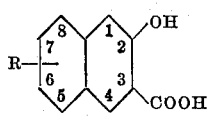

wherein R represents a hydroxy- or an amino group in 5- or 8-position, and further heating the bisulfite addition compound, thus obtained, with an arylhydrazine in the presence of sulfuric acid.

6. The process which comprises heating a bisulfite solution with a compound of the following general formula:

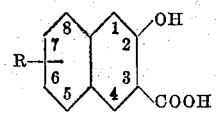

wherein R represents a hydroxy- or an amino group in 5- or 8-position, which compound has been neutralized by caustic alkali solution, and further heating the bisulfite addition compound, thus obtained, with an arylhydrazine in the presence of sulfuric acid.

7. The process which comprises heating a bisulfite solution with a salt of a compound of the following formula:

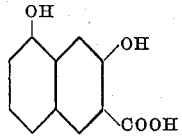

and further heating the bisulfite addition compound, thus obtained, with an arylhydrazine in the presence of sulfuric acid.

8. The process which comprises heating a bisulfite solution with a compound of the following formula:

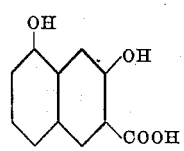

which compound has been neutralized by caustic alkali solution, and further heating the bisulfite addition compound, thus obtained, with an arylhydrazine in the presence of sulfuric acid.

9. The process which comprises heating a solution of about 1.1 mol of sodium bisulfite with about 1 mol of an alkali metal salt of 2.8-dihydroxy-naphthalene-3-carboxylic acid and further heating the bisulfite addition compound, thus obtained, with about 1 mol of an arylhydrazine in the presence of sulfuric acid.

10. The process which comprises heating a bisulfite solution with a salt of a compound of the following formula:

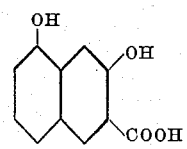

and further heating the bisulfite addition compound, thus obtained, with an arylhydrazine of the benzene or naphthalene series in the presence of sulfuric acid.

11. The process which comprises heating a bisulfite solution with a compound of the following formula:

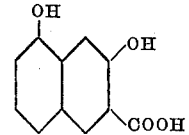

which compound has been neutralized by caustic alkali solution, and further heating the bisulfite addition compound, thus obtained, with an arylhydrazine of the benzene or naphthalene series in the presence of sulfuric acid.

12. The process which comprises heating a solution of about 1.1 mol of sodium bisulfite with about 1 mol of an alkali metal salt of 2.8-dihydroxynaphthalene-3-carboxylic acid and further heating the bisulfite addition compound, thus obtained, with about 1 mol of an arylhydrazine of the benzene or naphthalene series in the presence of sulfuric acid.

GEORG KALISCHER.
OTTO LIMPACH.
KARL HAGER.